US005501147A

United States Patent [19]

Jaffa et al.

[11] Patent Number: 5,501,147

[45] Date of Patent: Mar. 26, 1996

[54] AUTOMATIC DOFFING SYSTEM

[75] Inventors: David Jaffa; Sandor Szarka, both of Franklin Lakes, N.J.

[73] Assignee: Precision Screen Machines, Inc., Glen Ellyn, Ill.

[21] Appl. No.: 132,664

[22] Filed: Oct. 5, 1993

[51] Int. Cl.[6] .............................. B41F 15/18; B65G 47/52

[52] U.S. Cl. .......................... 101/118; 271/195; 271/202; 271/307; 198/461.2; 198/817

[58] Field of Search ..................................... 101/116, 117, 101/118, 126, 129, 232, 407.1, 408; 271/195, 196, 202, 307, 306, 312, 900; 198/460.1, 461.2, 817

[56] References Cited

U.S. PATENT DOCUMENTS

| | | | |
|---|---|---|---|
| 2,732,678 | 1/1956 | Blaser et al. | 198/817 |
| 3,545,588 | 12/1970 | Corley | 198/817 |
| 3,677,538 | 7/1972 | Wall | 271/195 |
| 4,176,601 | 12/1979 | Szarka | 101/115 |
| 4,285,507 | 8/1981 | Marinoff | 271/195 |
| 4,360,101 | 11/1982 | McGill et al. | 198/461 |
| 4,428,574 | 1/1984 | Kataoka | 271/307 |

FOREIGN PATENT DOCUMENTS

| | | |
|---|---|---|
| 2416858 | 9/1979 | France . |
| 1150647 | 6/1963 | Germany . |
| 1008026 | 10/1965 | United Kingdom . |

*Primary Examiner*—Stephen Funk
*Attorney, Agent, or Firm*—Hopgood, Calimafde, Kalil & Judlowe

[57] ABSTRACT

An apparatus and method for transferring an article from one conveyor to another and a printing system incorporating the same, including an array of endless conveyorized strips carried by a roller and a relatively rigid member, the roller and the member being positioned within the strips, and a mover operatively associated with the roller for effecting its rotation and hence movement of the strips. The apparatus is positioned between and in cooperation with adjacent ends of successive conveyors of a printing system. The surface of each strip is characterized by a series of upwardly extending projections, each projection being of a relatively small diameter in relation to its length. The roller is adjacent to the exit end of the apparatus and has disks positioned longitudinally between the strips and coaxially with and about the roller at intervals across its width. The disk diameters are sufficiently greater than that of the roller as to extend above the projections, lifting the article from the projections as it passes over the roller and carrying it to the other conveyor.

25 Claims, 8 Drawing Sheets

AUTOMATIC DOFFING SYSTEM

BACKGROUND OF THE INVENTION

The present invention relates to printing systems, and more particularly to an improved apparatus and method for transferring an article from one conveyor to another.

Doffing of articles (such as textiles, plastic sheets or the like) is commonly accomplished by a revolving cylinder covered circumferentially with needle tape, positioned in close proximity to a printing blanket, and driven clockwise against the same speed, clockwise rotation of the blanket. The objective is to strip articles from the printing blanket and transfer them to a conveyorized belt for subsequent stage(s) of printing operations, e.g., a drying system.

While needle tape has been found relatively useful in grabbing articles, and pulling them from the blanket, it tends to hold onto the articles when their release is desired, for example, when transferring articles to the conveyor belt. This has caused portions of the articles to turn over, bunch or roll up. As a result, wet printed images on the articles have been damaged and frequent work stoppages required, hindering subsequent operations of the printing system.

In addition, the same speed operation (fixed R.P.M. ratios) of the conveyor belt and blanket have been found to not only inhibit smooth transfer, but also produce inconsistent images with variations in weight, orientation, shape or fiber content of the articles, and with changes in ink, adhesive or tack.

SUMMARY OF THE INVENTION

In accordance with one aspect of the present invention there is provided an improved apparatus and method for transferring an article from one conveyor to another. The apparatus is positioned between and in cooperation with adjacent ends of successive conveyors of a printing system and includes an array of endless conveyorized strips carried by a roller and a relatively rigid member, the roller and member being positioned within the strips. Moving means are operatively associated with the roller for effecting its rotation and hence movement of the strips. The surface of each strip is characterized by a series of upwardly extending projections, each projection having a relatively small diameter in relation to its length. The roller is adjacent to the exit end of the apparatus (or entrance to the second of the successive conveyors) and has disks positioned longitudinally between the strips and coaxially with and about the roller at intervals across its width. The diameter of each disk is sufficiently greater than that of the roller as to extend above the projections, lifting the article from the projections as it passes over the disks and carrying it to the other conveyor.

The present invention is directed to an apparatus for transferring an article from one conveyor to another, which comprises:

- a series of endless conveyorized strips carried by a roller and a relatively rigid member;
- moving means operatively associated with the roller for effecting its rotation and driving the strips;
- disks positioned longitudinally between the strips and coaxially with the roller at intervals across its width;
- the surface of the strips being characterized by a series of upwardly extending projections, each having a relatively small diameter in relation to its length;
- the diameter of each disk being sufficiently greater than that of the roller such that as the article passes over the disks, the article is lifted from the projections and transferred to the other conveyor.

The present invention is further directed to a method of transferring an article from one conveyor to another, which comprises the steps of:

- grabbing the article from the exit end of one conveyor using a series of upwardly extending projections arranged about the surface of endless conveyorized strips, each projection being of a relatively small diameter in relation to its length;
- lifting the article from the projections by disks positioned longitudinally between the strips, coaxially with a roller driving the strips, and at intervals across the roller width, the diameter of each disk being greater than that of the roller; and
- transferring the lifted article to the other conveyor.

Accordingly, it is an object of the present invention to provide an apparatus and method which increases both the quality and speed of production.

Another object of the present invention is to provide an apparatus and method which prevents articles from rolling up, bunching or turning over along their edges upon transfer from one conveyor to another.

Still another object of the present invention is to provide an economical apparatus and method for transferring articles automatically from one conveyor to another.

The present invention will now be further described by reference to the following drawings which are not to be deemed limitative in any manner thereof.

BRIEF DESCRIPTION OF THE DRAWINGS

The same numerals are used throughout the various figures of the drawings to designate similar parts.

Figure 1:
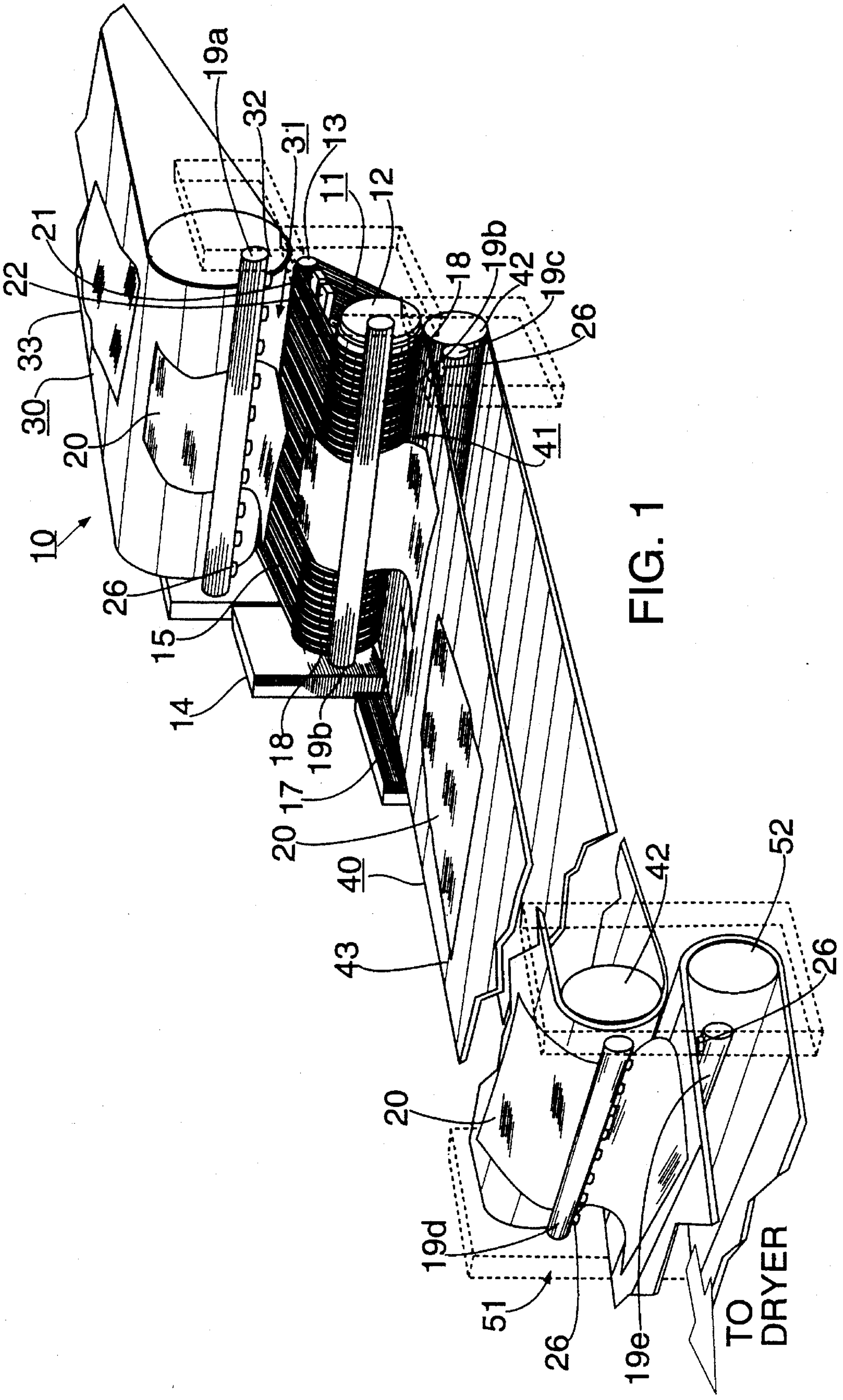
FIG. 1 is a perspective view of an apparatus embodying the present invention.

Still other objects and advantages of the present invention will become apparent from the following description of the preferred embodiments.

DETAILED DESCRIPTION OF THE PREFERRED EMBODIMENTS

FIGS. 1–9 generally illustrate an apparatus 10 for transferring an article 20, e.g., a cloth panel or plastic sheet, from one conveyor 30 to another 40 as part of a printing system. The apparatus is positioned between and in cooperation with adjacent ends 31, 41 of the successive conveyors and includes an array of endless conveyorized strips 11 carried both by roller 12 and relatively rigid member 13, the roller and the member being positioned within the strips. Moving means 14 are operatively associated with the roller for effecting its rotation and hence continuous, or intermittent, translation of the strips. The surface 15 of each strip is characterized by a series of upwardly extending projections 16, each projection having a relatively small diameter in relation to its length.

Roller 12 is positioned adjacent to exit end 17 of the apparatus. Disks 18, curvilinear surfaces, or the like are positioned longitudinally between the strips and coaxially with and about the roller at intervals across its width. The disks are oriented and dimensioned so as to extend above the projections such that the article is lifted from the projections as it passes over the roller (and disks), thereby facilitating transfer of the article to the next conveyor. The roller is preferably rolling-pin like and of a selected diameter, e.g., within a range of about 2½ to 6½ inches. It is also preferred that the roller be relatively larger in diameter (or wider) than the rigid member. For example, a ratio of 16:3 between their respective diameters has been found suitable.

The rigid member or turning bar 13 is mounted, preferably at the receiving end of the apparatus, to an adjustable horizontal support member 21 which is suspended within the strips, generally parallel to the bar and the roller. The bar is relatively rigid, but has a curved contact surface which allows the strips to pass over it with relative ease.

Figure 2:
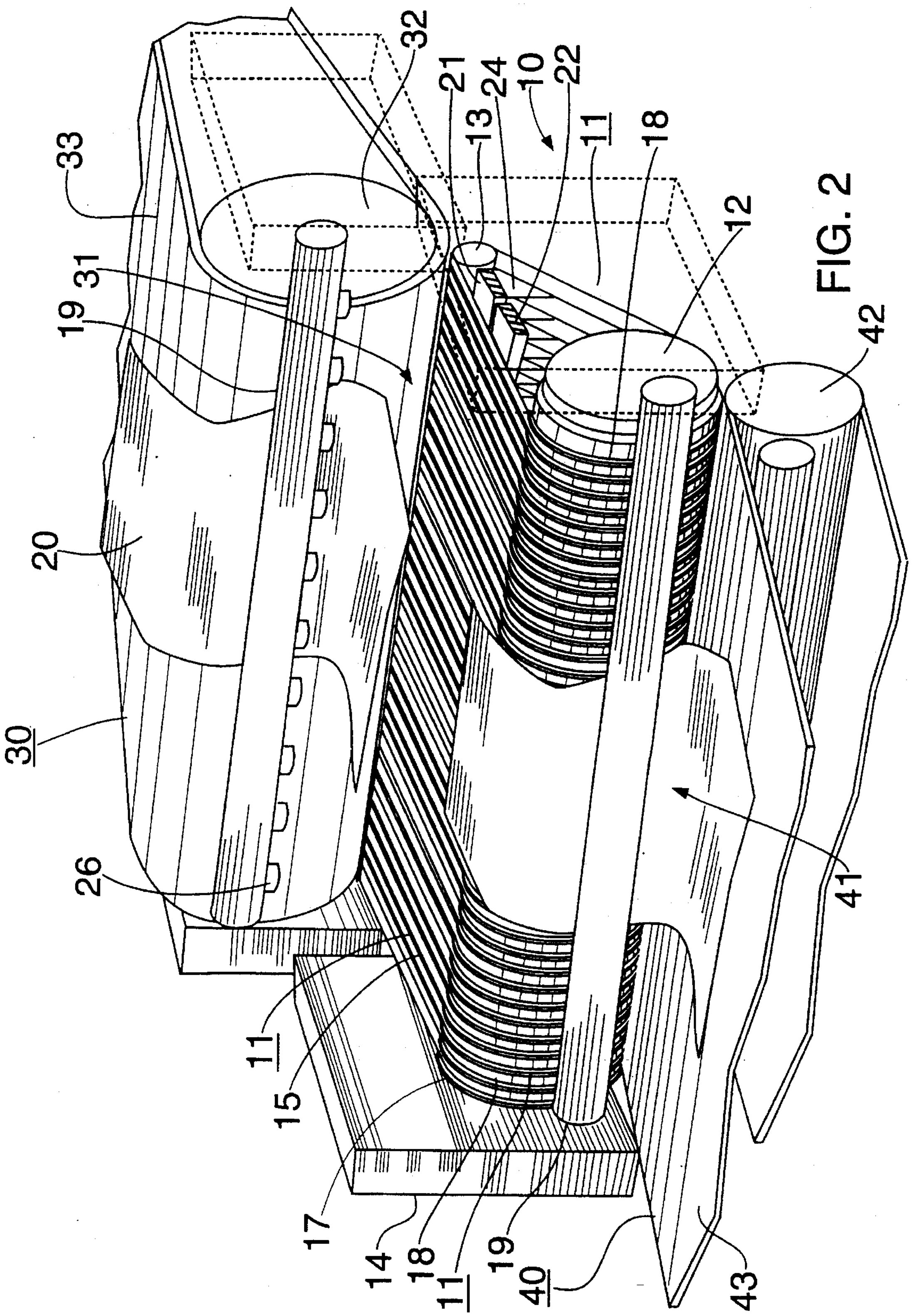
FIG. 2 is an enlarged view of the embodiment shown in FIG. 1.
Figure 3:
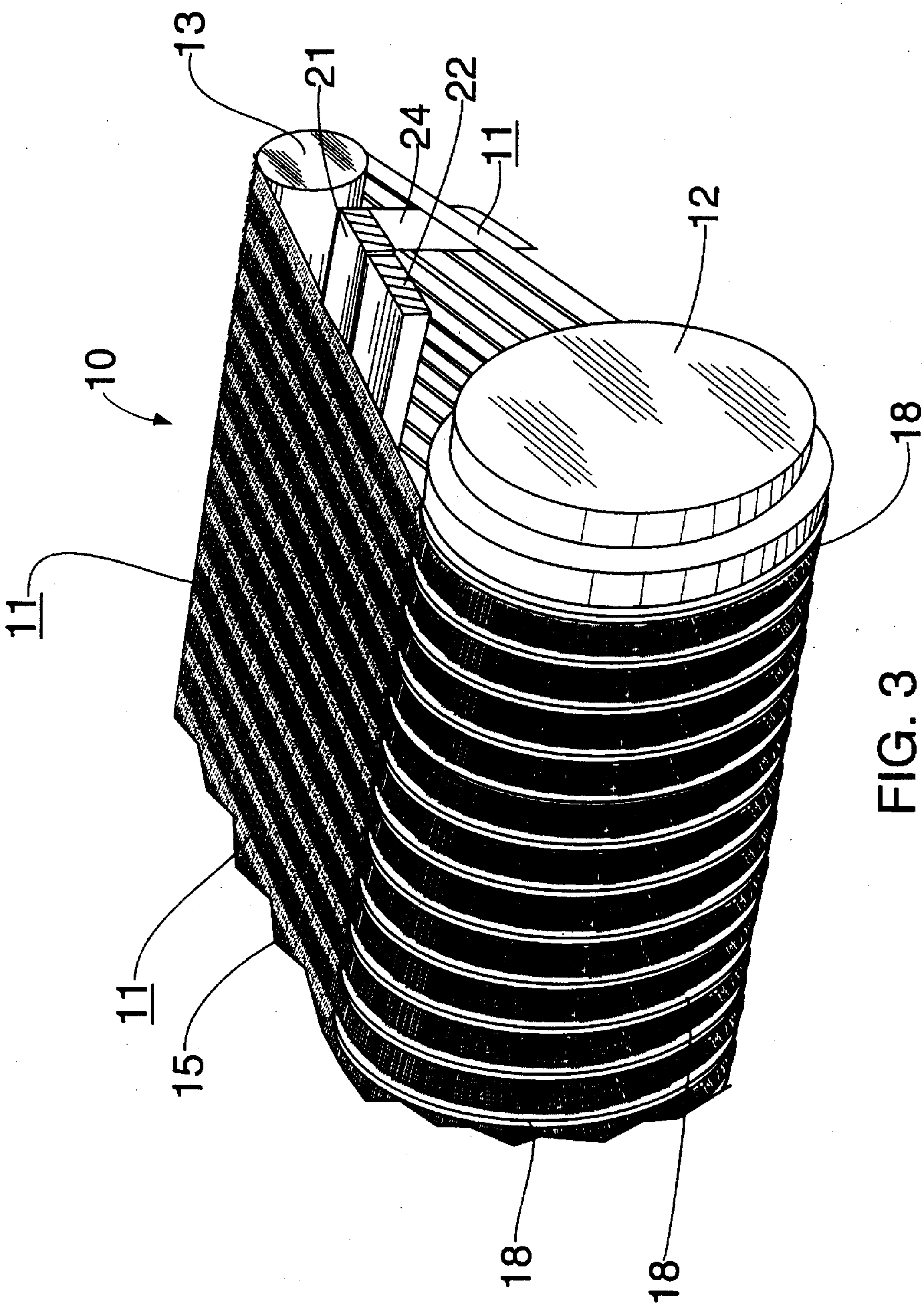
FIG. 3 is an enlarged view of operative portions of the embodiment of FIG. 2.
Figure 4:
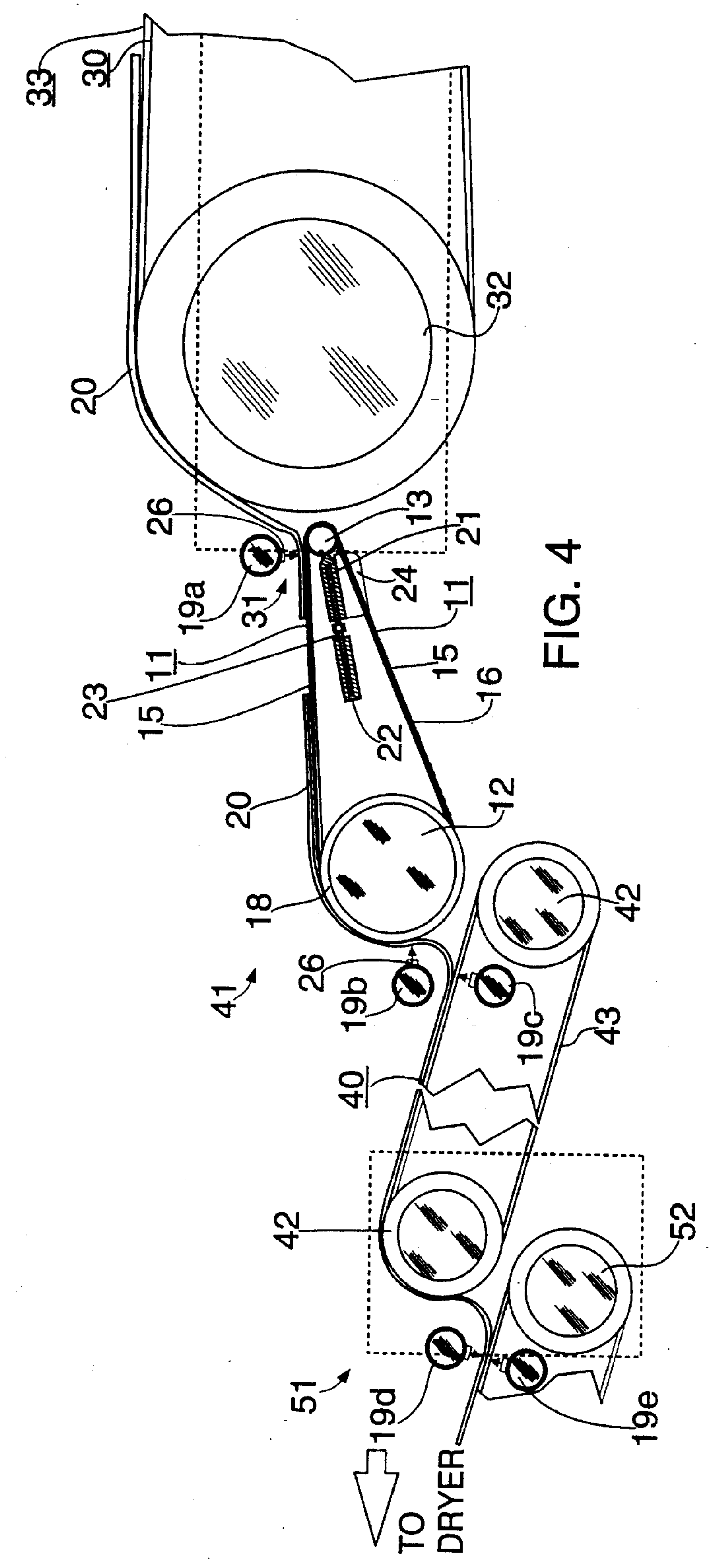
FIG. 4 is a side view of the apparatus of FIG. 1.
Figure 5:
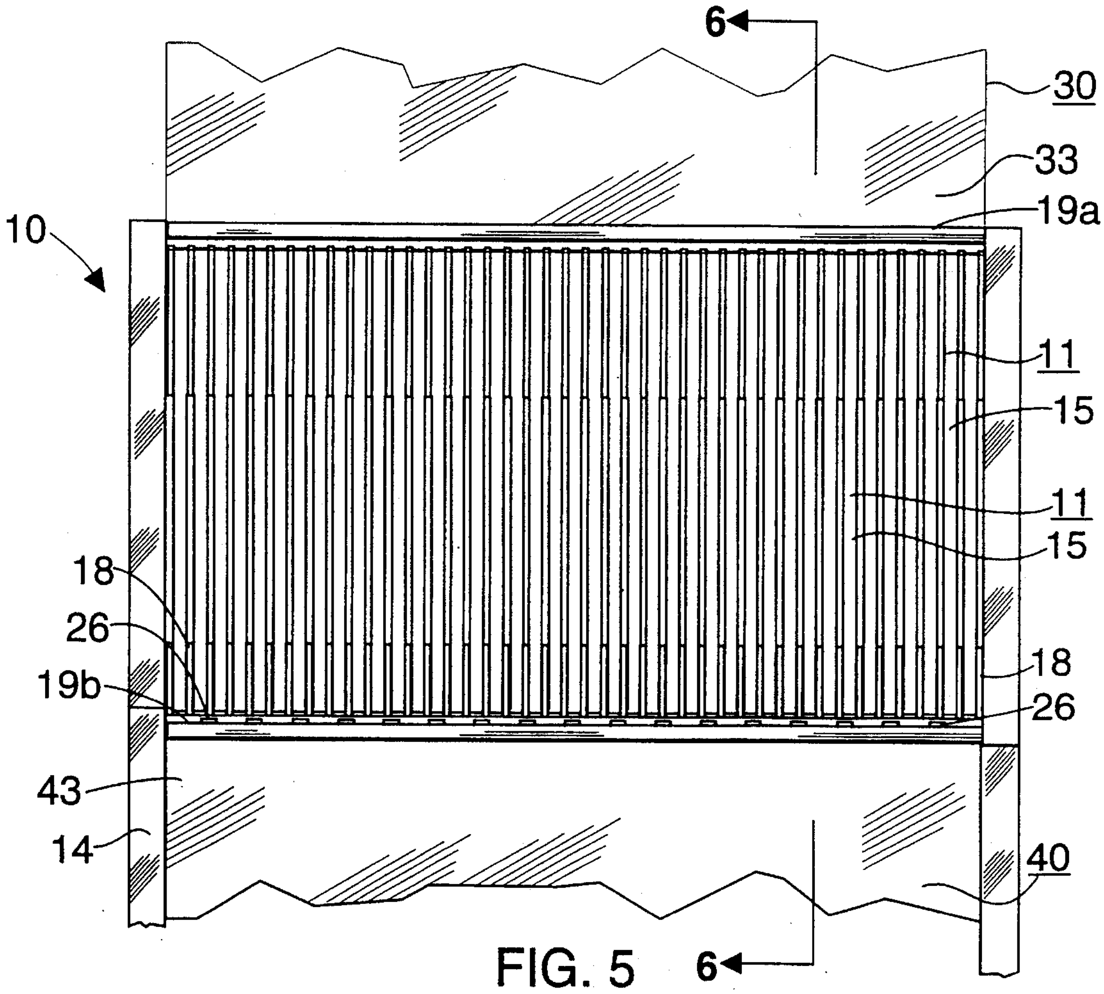
FIG. 5 is a plan view of an alternative embodiment of the apparatus of FIG. 2.

Fins 24 are located between the strips, generally extending from lower portions of the support member at intervals across its width, as shown in FIGS. 2–4. The distance of each interval typically corresponds to that of the disks. Each fin is generally aligned with a corresponding disk on roller 12 such that disk and fin pairs guide needle tape passing between them.

The roller and turning bar are spaced apart horizontally and in cooperation with opposing end rollers 32, 42 of the adjacent successive conveyors; each roller and turning bar preferably being located such that the tips of the projections are in close proximity to the adjacent opposing end rollers. Suitable distances include those which allow passage of the projections over the roller and turning bar without contacting surfaces of the adjacent conveyors 33, 43, but sufficient to contact articles passing over the opposing rollers of adjacent conveyors. Typically, the distances approximate the thickness of the articles. An objective is to insure uniform contact between the projections and the article. Another objective is to move the "V" gap between the conveyor and the rigid member away from where the articles pass.

Figure 8A:
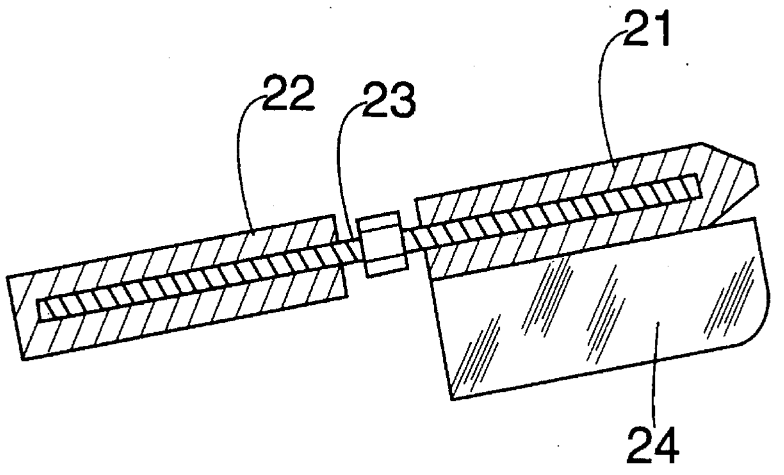
FIG. 8A is a side sectional view of a tensioning device in accordance with one aspect of the present invention.
Figure 8B:
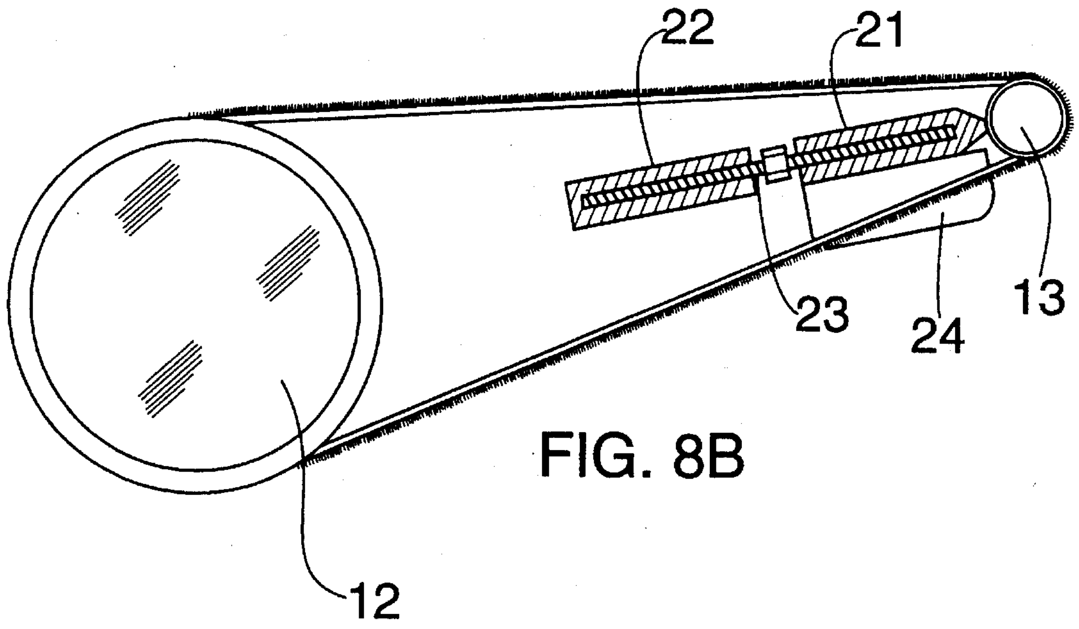
FIG. 8B is an enlarged of the tensioning device of FIG. 8A.
Figure 9:
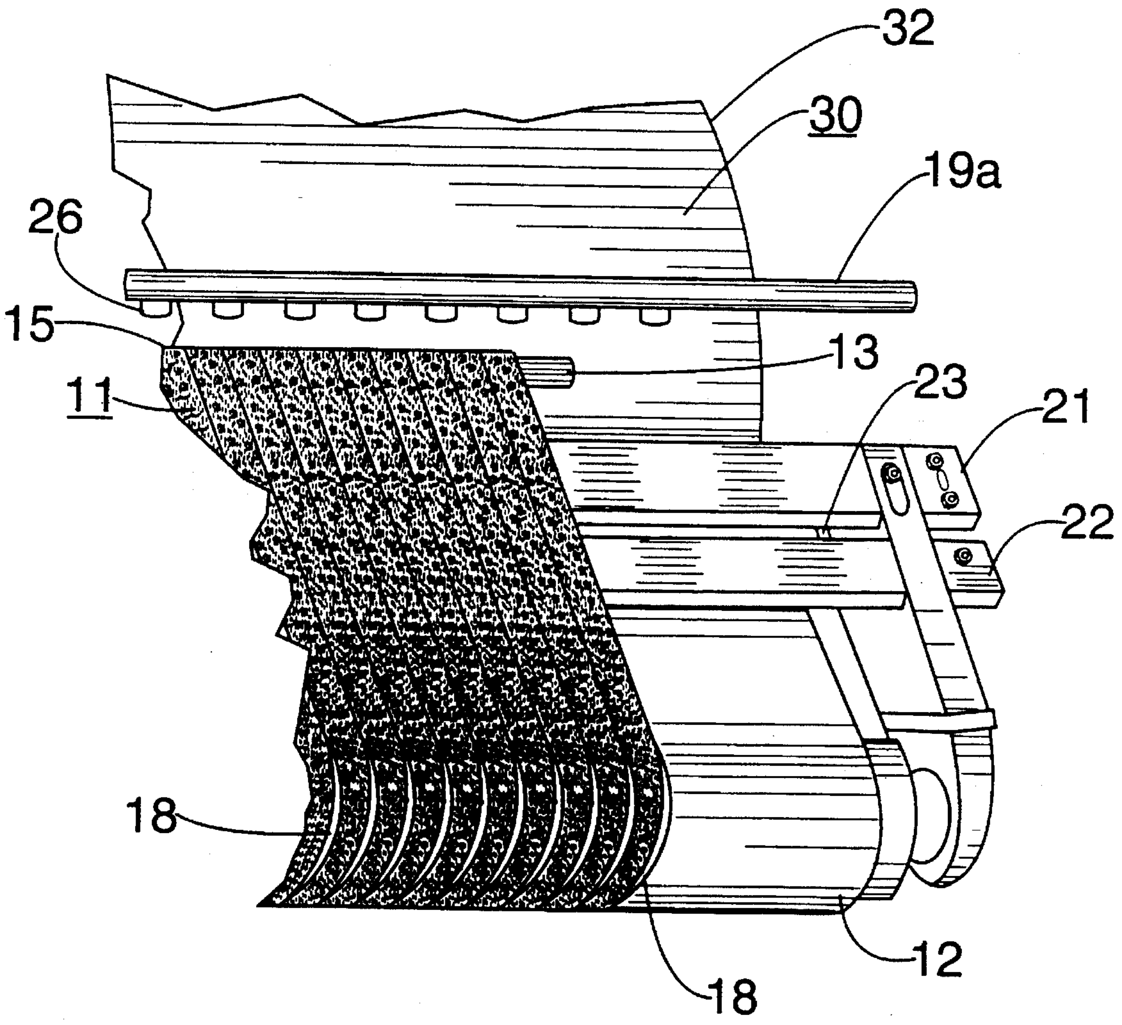
FIG. 9 is a perspective view of one end of an apparatus embodying the present invention.

A fixed horizontal support arm 22 is spaced apart from the support member and also generally parallel thereto. As shown in FIGS. 8A and 8B, adjustment screws 23, spaced at intervals across the member, pass through the support member and into the arm for varying the tension on the strips, i.e., to move the projections closer or further away from the adjacent end of the printing blanket.

The strips fit snugly over and extend between the roller and turning bar such that they are maintained in a relatively flat horizontal plane. Surface 15 of each strip comprises a plurality of needle-like projections 16 arranged longitudinally and generally parallel to one another across the roller width. As each strip moves over roller 12, the upwardly extending disks (arranged coaxially with and about the roller and longitudinally at intervals across its width) pass between them. Again, the diameter of each disk is sufficiently greater than that of the roller that the disk extends above the projection and lifts the article from the projections as the article passes over the disks.

It is preferred that the disk diameters and lengths of the projections be generally uniform throughout. Also, each strip is preferably needle tape, as the term is understood by those skilled in the art, and is made of a relatively strong, flexible material. Suitable materials include rubber and cotton.

Figure 6A:
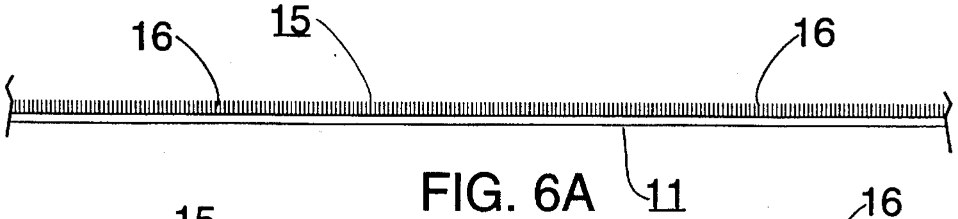
FIG. 6A is a side sectional view taken along line 6—6 of FIG. 5.
Figure 6B:
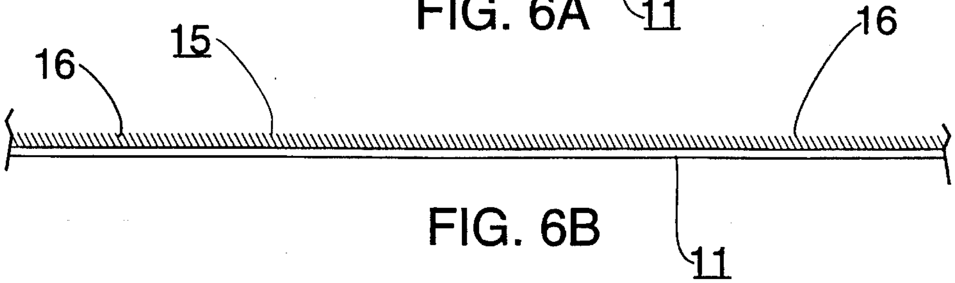
FIG. 6B is an alternative embodiment of the strip of FIG. 6A.

As the article passes over the end of the one conveyor, the projections on the strip surfaces snag the article, pulling it from the conveyor as the strip surfaces move over the turning bar. The projections then carry the article to the exit end of the apparatus, i.e., roller 12, where it encounters the rotating disks. As the article passes over the disks, each strip passes between a pair of disks, the disks gently separating the article from the projections and carrying it to the next conveyor. It is preferred that the projections be oriented either perpendicular to the strip or at a reverse incline to prevent damage to the article, as best seen in FIGS. 6A and 6B.

This gentle separation is achieved at least in part by physical characteristics of the disks. More particularly, because the disks extend above the projections, they travel a greater relative distance per unit of time, i.e., faster than the projections upon rotation of the roller. Their faster rotation and larger diameter, in conjunction with their curved surface, gradually lifts the article off the projections without damage either to the projections or the article.

In this manner, the disks advantageously transfer the article from one conveyor to the other without portions of the article turning over, e.g., wet edges of a freshly printed sheet of cloth. Bunching or rolling of the article and concomitant smearing of the printed image is also prevented, improving the quality of the image and increasing production.

In an alternative embodiment of the present invention, the strips rotate faster than the printing blanket conveyor. As a result, the process of stripping the article from the projections begins sooner, preventing the article material, e.g., cloth, from moving below the ideal stripping point. Below this point, edges of the article may turn over as the article passes over the roller. By variably increasing the speed of the strips, the projections travel at an optimum (a faster) speed in relation to the article being doffed.

Figure 7A:
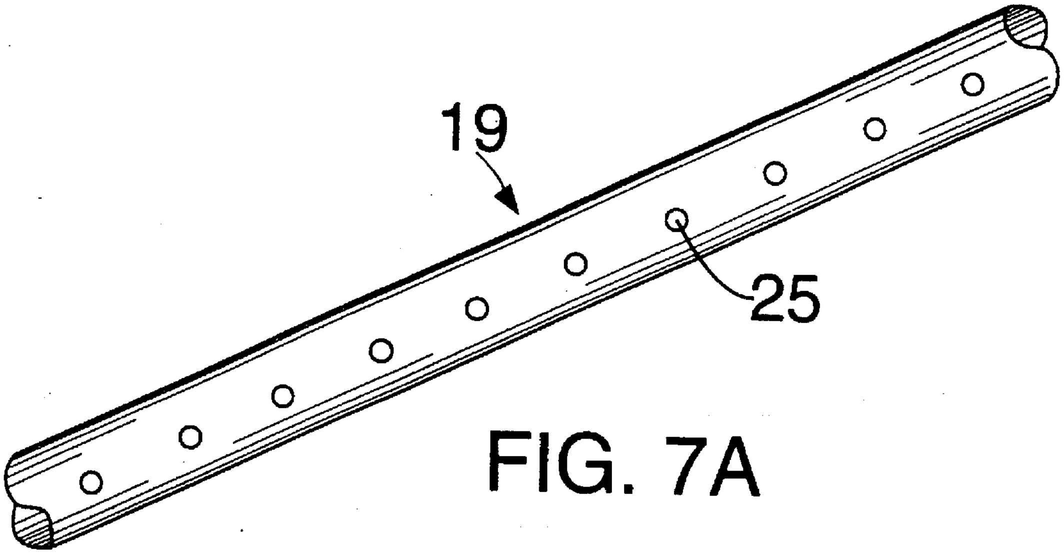
FIG. 7A is a perspective view of a blower, as shown in FIG. 4.
Figure 7B:
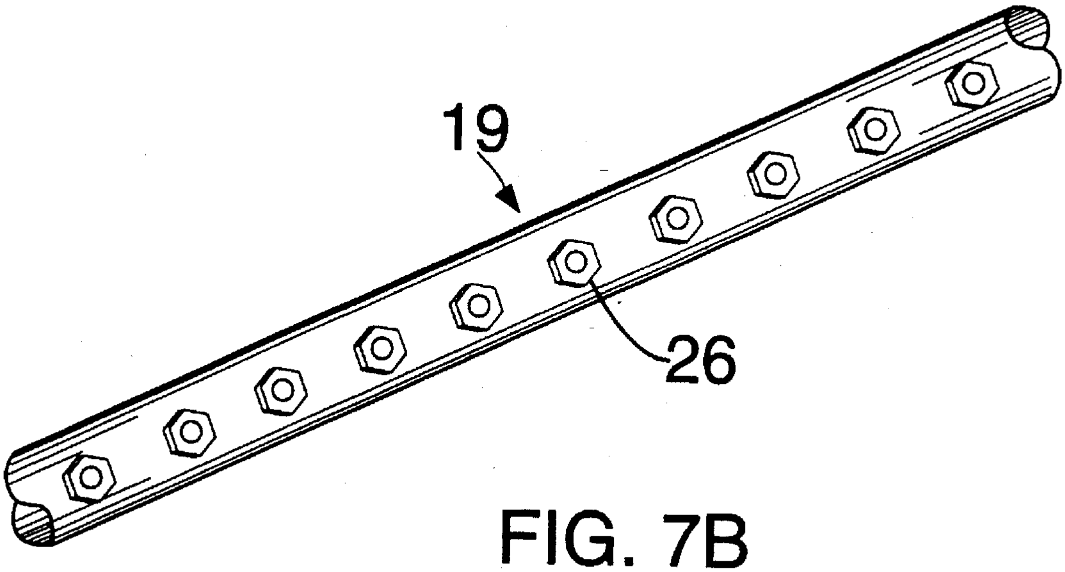
FIG. 7B is a perspective view of an alternative embodiment of the blower in FIG. 7A.

Preferably, blowers or perforated hollow members **19*a*, 19*b* and 19*d* are mounted across, but not in contact with, each adjacent end 31, 41, 51 of the successive conveyors, as best seen in FIGS. 1 and 4. As best seen in FIG. 7A, perforations 25 are preferably arranged along a linear pathway. Alternatively or concurrently therewith, nozzles 26 are mounted in, or used in place of, the perforations, as best seen in FIG. 7**B.

A fluid such as air is circulated steadily or intermittently through each member and out the nozzles. As shown in FIG. 4, the nozzles are directed such that the air forces the articles against the respective disks. Where pervious belts are used on the transfer and dryer conveyors, alternatively or concurrently with the present embodiment, at least one member **19*c*, 19*e* is additionally located beneath the conveyor for lifting articles away from the conveyor during transfer. In this manner, the members assist in preventing article edges from turning over upon passage of the article from printing blanket 30 to apparatus 10, from the apparatus to transfer conveyor 40**, and so forth.

Each member may be adjusted, repositioned, and/or removed so as to optimize its effectiveness with variations in roller diameter and blanket/conveyor speed and pitch. Also, more than one member, e.g., two, have been found relatively desirable for use at adjacent rollers or drums of conveyor ends 41 and 51.

Rotation of roller 12 is effected by moving means 14, e.g., a conventional electric motor (not shown). Movement of the strips is controlled by the motor in that it may be operated continuously or intermittently, i.e., to index the strips at selected time intervals.

It is generally preferred that each successive conveyor operate either at the same speed or at a higher speed than the prior conveyor. For example, increasing the speed of the strips in relation to the printing blanket has been found to effect smooth transfer of articles from one to the other.

In this connection, the printing system is provided with separate, infinitely variable speed drives; one each for the printing blanket/conveyor, the doffer conveyor (strips), the transfer conveyor, and the dryer conveyor. Each drive operates faster than, or at the same speed as, that of the preceding conveyor to effect transfer of the article, e.g., a freshly printed garment, from a printing apparatus to a dryer in a relatively flat, unchanged condition. By increasing the speed of each successive conveyor, the article, e.g., cloth, is stretched and pulled along by the projections during transfer. Suitable relative speeds include, for example, 140 feet/minute for the printing blanket, 144 feet/minute for the doffer strips, 148 feet/minute for the transport conveyor, and 152 feet/minute for the dryer conveyor.

It is understood by those skilled in the art that the dryer usually operates at a relatively slow speed which increases when the article is transferred from the transport conveyor to the dryer. The timing and duration of each increase corresponds to and occurs simultaneously with that of each indexing movement of the printing blanket.

Speed control is effected electronically, e.g., by a computer which synchronizes, adjusts and maintains the speed of each conveyor in relation to the others. In this manner, the printing system is readily adjusted during production to permit its adaptation to changing conditions. For instance, when printing groups of textile materials, each may have varying characteristics and printing requirements including different weights, orientations, shapes or fiber content, and changes in ink, adhesive or tack.

The conveyors of the printing system may operate over a range of speeds, though giving consideration to the nature and weight of the fabric, and the dryer retention time needed, while minimizing the spacing of the articles as they are transferred to the dryer. Suitable dryers are set forth, for example, in U.S. Pat. Nos. 3,795,060 and 4,176,601, the disclosures of which are hereby incorporated by reference. Three-tiered, flat conveyor dryers have also been found suitable.

To insure that articles remain at a selected location on the printing blanket and transfer conveyor, and to minimize slippage over their respective drums 32, 42, 52 the respective blanket and conveyor are constructed preferably of a relatively strong, rigid material having a non-slip surface. It is also preferred that they be of uniform thickness and have a smooth, distortion-free surface. Resistance to chemicals typically used during printing is also desirable. Suitable materials include, for example, KEVLAR or a polyurethane coated polyester. Alternatively, the transfer conveyor is surfaced with needle tape throughout.

The embodiments illustrated above involve application of the present invention to multistage printing systems typically utilized for screen printing articles. However, its application to any printing or nonprinting system, apparatus and/or method is understood, giving consideration to the purpose for which the present invention is intended.

Also, while the present invention is shown and described for use in conjunction with sheets of textiles or plastic, its application to other articles such as T-shirts will be understood by those skilled in the art, giving consideration to the purpose for which the present invention is intended.

Since from the foregoing the construction and advantages of the invention may be readily understood, further explanation is believed unnecessary. However, since numerous modifications will readily occur to those skilled in the art after consideration of the foregoing specification and accompanying drawings, it is not intended that the invention be limited to the exact construction shown and described, but all suitable modifications and equivalents may be resorted to which fall within the scope of the appended claims.

What is claimed is:

1. An apparatus for transferring an article from one conveyor to another, which comprises:

an array of endless conveyorized strips carried by a roller and a substantially rigid member;

moving means operatively associated with the roller for affecting rotation of the roller and driving the strips;

disks positioned longitudinally between the strips and coaxially with the roller at intervals across its widths;

the surface of the strips being characterized by a series of upwardly extending projections, each having a relatively small diameter in relation to its length; and the disk diameters being sufficiently greater than that of the roller as to extend above the projections, lifting the article from the projections as it passes over the disks and carrying it to the other conveyor.

2. The apparatus set forth in claim 1 wherein the strips comprise needle tape.

3. The apparatus set forth in claim 1 wherein the one conveyor is a printing blanket.

4. The apparatus set forth in claim 1 wherein the roller and the rigid member are positioned within the strips.

5. The apparatus set forth in claim 1 wherein at least one blower is positioned across and forward of the roller relative to its direction of rotation for directing fluid generally toward the disks.

6. The apparatus set forth in claim 1 wherein at least one blower is positioned across and foward of an adjacent end of the one conveyor for directing fluid generally toward the strips.

7. A method of transferring an article from one conveyor to another conveyor, which comprises the steps of:

grabbing the article from an exit end of the one conveyor using a series of upwardly extending projections arranged about the surface of the endless conveyorized strips, each projection being of a relatively small diameter in relation to its length;

lifting the article from the projections by disks positioned longitudinally between the strips, coaxially with a roller driving the strips, and at intervals across the roller width, the diameter of each disk being greater than that of the roller; and transferring the lifted article to the other conveyor.

8. The method set forth in claim 7 wherein the strips comprise needle tape.

9. The method set forth in claim 7 wherein the one conveyor is a printing blanket.

10. The method set forth in claim 7 wherein the roller and a rigid member are positioned within the strips.

11. An apparatus for transferring an article from one conveyor to another, the apparatus being positioned between and in cooperation with adjacent ends of the conveyors and comprising:

an array of endless conveyorized strips carried by a roller and a substantially rigid member;

moving means operatively associated with the roller for effecting rotation of the roller and driving the strips;

disks positioned longitudinally between the strips and coaxially with the roller at intervals across its width;

the surface of the strips being characterized by a series of upwardly extending projections, each having a relatively small diameter in relation to its length; and the disk diameters being sufficiently greater than that of the rollers such that as the article passes over the disks, the article is lifted from the projections and transferred to the other conveyor.

12. An apparatus for transferring an article from one conveyor to another, which comprises:

an array of endless conveyorized strips carried by a roller and a substantially rigid member, the roller and the member being positioned within the strips;

moving means operatively associated with the roller for effecting rotation of the roller and driving the strips; and disks positioned longitudinally between the strips and coaxially with and about the roller at intervals across its width;

the surface of the strips being characterized by a series of upwardly extending projections, each having a relatively small diameter in relation to its length.

13. An apparatus for transferring an article from one conveyor to another, which comprises:

an array or endless conveyorized strips carried by a roller and a substantially rigid member;

disks positioned longitudinally between the strips and coaxially with the roller at intervals across its width;

first blower means for biasing the article generally toward the disks; and second blower means for lifting the article away from the other conveyor.

14. The apparatus set forth in claim 13 wherein the first blower means includes at least one perforated hollow member.

15. An apparatus for transferring an article from one conveyor to another, which comprises:

an array of endless conveyorized strips carried by a roller and a substantially rigid member;

moving means operatively associated with the roller for effecting rotation of the rollers and driving the strips;

disks positioned longitudinally between the strips and coaxially with the roller at intervals across its width; and means for controlling the speed of rotation of the roller relative to changes in speed of one of the conveyors;

the surface of the strips being characterized by a series of upwardly extending projections, each having a relatively smell diameter in relation to its length; and the disk diameters being sufficiently greater than that of the roller as to extend above the projections, lifting the article from the projections as the article passes over the disks and carrying it to the other conveyor.

16. A screen printing system which comprises:

(a) a printing blanket for carrying printed articles;

(b) a dryer;

(c) a conveyor for transporting the printed articles to the dryer;

(d) an apparatus for transferring the article from the blanket to the conveyor, the apparatus comprising an array of endless conveyorized strips carried by a roller and a substantially rigid member, disks positioned longitudinally between the strips and coaxially with the roller at intervals across its width, the surface of the strips being characterized by a series of upwardly extending projections, the disk diameters being sufficiently greater than that of the roller as to extend above the projections, lifting the article from the projections as it passes over the disks and carrying it to the other conveyor; and (e) means for sequentially controlling the speed of the printing blanket, the strips, the transport conveyor, and the dryer relative to one another so as to maintain an optimal speed ratio between them.

17. The system set forth in claim 16 wherein the control means maintains the speed of the strips relatively greater than that of the printing blanket and the transport conveyor relatively greater than that of the strips.

18. An apparatus for transferring an article from one conveyor to another, which comprises:

an array of endless conveyorized strips carried by a roller and a substantially rigid member;

moving means operatively associated with the roller for effecting rotation of the roller and driving-the strips;

members, each having a curvilinear surface, positioned longitudinally between the strips and coaxially with the roller at intervals across its width;

the surface of the strips being characterized by a series of upwardly extending projections, each having a relatively small diameter in relation to its length; and the curvilinear surfaces each having a radius of curvature sufficiently greater than that of the roller as to extend above the projections, lifting the article from the projections as it passes over the curvilinear surfaces and carrying it to the other conveyor.

19. A method of transferring an article from one conveyor to another conveyor, which comprises the steps of:

grabbing the article from an exit end of the one conveyor using a series of upwardly extending projections arranged about the surface of the endless conveyorized strips, each projection being of a relatively small diameter in relation to its length;

lifting the article from the projections by members, each having a curvilinear surface, positioned longitudinally between the strips, coaxially with a roller driving the strips, and at intervals across the roller width, the curvilinear surfaces each having a radius of curvature greater than that of the roller; and transferring the licked article to the other conveyor.

20. An apparatus for transferring an article from one conveyor to another, the apparatus being positioned between and in cooperation with adjacent ends of the conveyors and comprising:

an array of endless conveyorized strips carried by a roller and a substantially rigid member;

moving means operatively associated with the roller for effecting rotation of the roller and driving the strips;

members, each having a curvilinear surface, positioned longitudinally between the strips and coaxially with the roller at intervals across its width;

the surface of the strips being characterized by a series of upwardly extending projections, each having a relatively small diameter in relation to its length; and the curvilinear surfaces each having a radius of curvature sufficiently greater than that of the rollers such that as the article passes over the curvilinear surfaces, the article is lifted from the projections and transferred other conveyor.

21. An apparatus for transferring an article from one conveyor to another, which comprises:

an array of endless conveyorized strips carried by a roller and a substantially rigid member;

moving means operatively associated with the roller for effecting rotation of the roller and driving the strips;

members, each having a curvilinear surface, positioned longitudinally between the strips and coaxially with the roller at intervals across its width;

the surface of the strips being characterized by a series of upwardly extending projections, each having a relatively small diameter in relation to its length.

22. An apparatus for transferring an article from one conveyor to another, which comprises:

an array of endless conveyorized strips carried by a roller and a substantially rigid member;

the surface of the strips being characterized by a series of upwardly extending projections, each having a relatively small diameter in relation to its length.

moving means operatively associated with the roller for effecting rotation of the roller and driving the strips;

members, each having a curvilinear surface, positioned longitudinally between the strips and coaxially with the roller at intervals across its width; and blower means for biasing the article generally toward the curvilinear surfaces.

23. An apparatus for transferring an article from one conveyor to another, which comprises:

an array of endless conveyorized strips carried by a roller and a substantially rigid member;

members, each having a curvilinear surface, positioned longitudinally between the strips and coaxially with the roller at intervals across its width; and first blower means for biasing the article generally toward the curvilinear surfaces; and second blower means for lifting the article away from the other conveyor.

24. An apparatus for transferring an article from one conveyor to another, which comprises:

an array of endless conveyorized strips carried by a roller and a substantially rigid member;

moving means operatively associated with the roller for affecting rotation of the roller and driving the strips;

members, each having a curvilinear surface, positioned longitudinally between the strips and coaxially with the roller at intervals across its width; and means for controlling the speed of rotation of the roller relative to changes in speed of one of the conveyors;

the surface of the strips being characterized by a series of upwardly extending protections, each having a relatively small diameter in relation to its length; and the curvilinear surfaces each having a radius of curvature sufficiently greater than that of the roller as to extend above the projections, lifting the article from the projections as the article passes over the curvilinear surfaces and carrying it to the other conveyor.

25. A screen printing system which comprises:

(a) a printing blanket for carrying printed articles;

(b) a dryer;

(c) a conveyor for transporting the printed articles to the dryer;

(d) an apparatus for transferring the article from the blanket to the conveyor, the apparatus comprising an array of endless conveyorized strips carried by a roller and a substantially rigid member, members, each having a curvilinear surface, positioned longitudinally between the strips and coaxially with the roller at intervals across its width, the surface of the strips being characterized by a series of upwardly extending projections, the curvilinear surfaces each having a radius of curvature sufficiently greater than that of the roller as to extend above the projections, lifting the article from the projections as it passes over the curvilinear surfaces and carrying it to the other conveyor; and (e) means for sequentially controlling the speed of the printing blanket, the strips, the transport conveyor, and the dryer relative to one another so as to maintain an optimal speed ratio between them.

* * * * *